No. 643,075. Patented Feb. 6, 1900.
J. W. VAN BROCKLIN.
WATER, STEAM, OR AIR VALVE.
(Application filed Nov. 2, 1898.)
(No Model.)
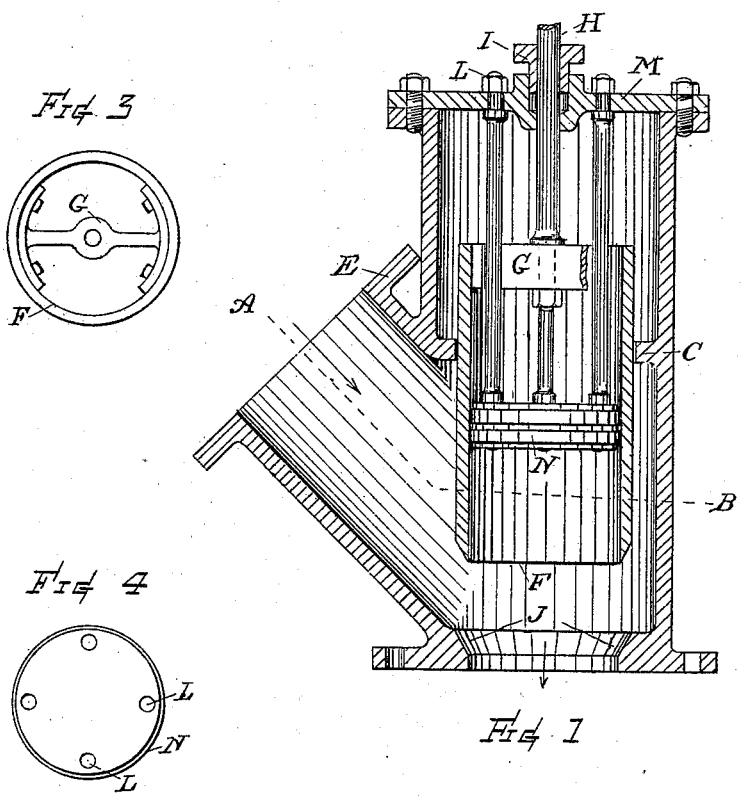
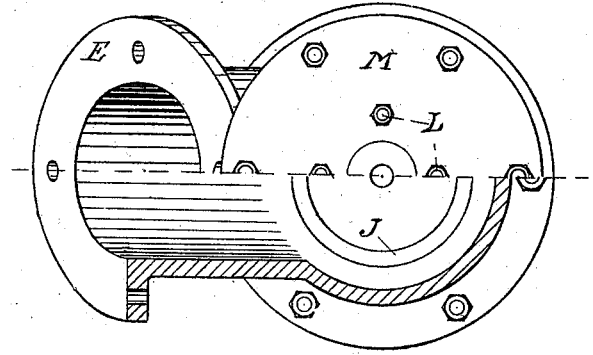
WITNESSES:
Laurence D. Booth
Sylvanus C. Harris
INVENTOR
John W. Van Brocklin
BY
Charles F. Whittlesey,
His ATTORNEY.
THE NORRIS PETERS CO., PHOTO-LITHO., WASHINGTON, D. C.

UNITED STATES PATENT OFFICE.

JOHN W. VAN BROCKLIN, OF SEATTLE, WASHINGTON, ASSIGNOR OF ONE-SIXTEENTH TO RUSSELL L. DUNN, OF SAN FRANCISCO, CALIFORNIA.

WATER, STEAM, OR AIR VALVE.

SPECIFICATION forming part of Letters Patent No. 643,075, dated February 6, 1900.

Application filed November 2, 1898. Serial No. 695,334. (No model.)

*To all whom it may concern:*

Be it known that I, JOHN W. VAN BROCKLIN, a citizen of the United States, residing at Seattle, King county, in the State of Washington, have invented a new and useful Water, Steam, or Air Valve, of which the following is a specification.

My invention relates to improvements in a valve used under pressure either for water, steam, or air; and the object of my improvement is to avoid lifting a heavy weight and unnecessary friction in opening and closing the valve while working under pressure. I attain this object by the mechanism illustrated in the accompanying drawings, in which—

Figure 1 is a vertical section of valve and chest. Fig. 2 is a top view of same, one-half being shown in section on the line A B of Fig. 1. Fig. 3 is an end view of valve. Fig. 4 is a surface view of fixed piston or diaphragm.

C is the chest in which the valve F moves and is attached to the inlet-pipe at E, being provided at the upper line of junction with an internally-presented annular guide rib or flange. The valve F, being a hollow cylinder, moves up and down over the fixed piston N, which is securely fastened to the lid M by the four studs L L. The valve F has a cross-bar G, to which is secured the stem H, which passes through the stuffing-box I. (See Fig. 1.) The chest C, having a larger inside diameter than the outside diameter of the valve, allows the water, air, or steam to surround the valve, thereby offering no resistance to its movement, also passing over the top of the valve. The pressure is carried by the fixed diaphragm or piston, thus leaving the valve free in its movement, except its own weight and the friction of the piston and the stuffing-box around the stem. The seat J is bored to correspond to the bevel on the valve. (See Fig. 1.) The inlet and outlet are shown by arrows.

What I claim as my invention, and desire to secure by Letters Patent, is—

1. In combination with a cylindrical valve, a casing having an inlet and outlet and a valve-seat surrounding the latter, a valve-chest forming part of said casing and provided with an internally-presented annular guide rib or flange in contact with the said valve, and a fixed piston within the said valve, coöperating with the said rib in guiding the same, substantially as and for the purpose set forth.

2. A valve-casing provided with a fixed and closed top, a lateral inlet and an outlet and valve-seat below the same, in combination with a fixed piston fastened by bolts to the said top, a cylindrical valve working up and down over the said piston and adapted to engage the said seat, and means for actuating the said valve, the said casing being provided with a fluid-space surrounding the said valve, substantially as and for the purpose set forth.

JOHN W. VAN BROCKLIN.

Witnesses:
FRANK M. JORDAN,
LAWRENCE S. BOOTH.